(12) United States Patent
    Hernandez Olvera

(10) Patent No.: US 12,644,600 B2
(45) Date of Patent: Jun. 2, 2026

(54) DEVICE FOR CAPTURING OILY EMISSIONS

(71) Applicant: Ciro Alfredo Hernandez Olvera, Mexicali (MX)

(72) Inventor: Ciro Alfredo Hernandez Olvera, Mexicali (MX)

( * ) Notice: Subject to any disclaimer, the term of this patent is extended or adjusted under 35 U.S.C. 154(b) by 879 days.

(21) Appl. No.: 17/791,757

(22) PCT Filed: Jan. 25, 2021

(86) PCT No.: PCT/MX2021/050005
    § 371 (c)(1),
    (2) Date: Jul. 8, 2022

(87) PCT Pub. No.: WO2021/141482
    PCT Pub. Date: Jul. 15, 2021

(65) Prior Publication Data
    US 2023/0034971 A1     Feb. 2, 2023

(30) Foreign Application Priority Data
    Jan. 10, 2020   (MX) .................. MX/u/2020/000024

(51) Int. Cl.
    *F23J 15/04*        (2006.01)
    *B01D 47/06*        (2006.01)
    (Continued)

(52) U.S. Cl.
    CPC .............. *F23J 15/04* (2013.01); *B01D 47/06* (2013.01); *B01D 53/78* (2013.01); *B01D 53/92* (2013.01); *F01N 3/04* (2013.01); *F23G 7/06* (2013.01)

(58) Field of Classification Search
    None
    See application file for complete search history.

(56) References Cited

U.S. PATENT DOCUMENTS 3,336,733 A * 8/1967 Wisting ................ B01D 47/06
                                                    261/DIG. 54
3,563,005 A * 2/1971 Name not available ...................
                                                    F24C 15/20
                                                    96/265

(Continued)

FOREIGN PATENT DOCUMENTS

WO       WO-02068874 A1 * 9/2002 ............... F23J 15/04
WO       WO-2015181846 A1 * 12/2015 ............... F23J 15/08

*Primary Examiner* — David J Laux
(74) *Attorney, Agent, or Firm* — Donn K. Harms

(57)             ABSTRACT

This invention deals with an emission capture device with grease which is composed of a main duct, here it is connected to the outlet of the emitter of particles which are required to be treated (said emitter is conventional, such as an internal combustion engine exhaust, incinerator duct, meat roaster chimney, etc. Just to mention a few), it is then absorbed and propelled by an electric fan, from which its wind force drives the emissions into the emissions capture tank, the mechanism to dissolve the particulate emissions inside the tank is composed of, The mechanism to dissolve the emission particles inside the tank is composed of the main duct inside the tank, which reaches the upper part of the tank, making a spiral return to the lower part of the tank, having the main duct as its end, through which the emission already dissolved in the liquid comes out, between the mechanism to dissolve the emission and the walls of the tank it has four supports, in the upper part of the tank it has its outlet duct to the open air, it also has four liquid inlet ducts, At the bottom of the tank there are two outlets to drain the liquid and direct it to a cooling device, and from there it is transported through a duct to a decanter tank, which in its lower part has a decanter tank, and at the same time it is transported to the bottom of the tank, On one side of the decanter tank is a duct that is connected directly to a pump that is responsible for driving and supplying the liquid (Continued)

through its outlet duct directly to the ducts that are responsible for distributing the liquid to the emissions capture tank and its mechanism to dissolve the emissions that are treated there.

12 Claims, 4 Drawing Sheets

(51) Int. Cl.
  B01D 53/78        (2006.01)
  B01D 53/92        (2006.01)
  F01N 3/04        (2006.01)
  F23G 7/06        (2006.01)

(56)                References Cited

U.S. PATENT DOCUMENTS

| | | | | |
|---|---|---|---|---|
| 8,378,834 | B1 * | 2/2013 | Glaub .................... | A62C 3/006 |
| | | | | 169/56 |
| 2005/0138922 | A1 * | 6/2005 | Boncodin .............. | B01D 53/92 |
| | | | | 60/272 |
| 2014/0245892 | A1 * | 9/2014 | Hernandez Olvera ...................... | |
| | | | | B01D 47/021 |
| | | | | 96/235 |
| 2020/0253417 | A1 * | 8/2020 | Xu ......................... | B01D 29/50 |

* cited by examiner

DEVICE FOR CAPTURING OILY EMISSIONS

TECHNICAL FIELD

This is a mechanical utility model that captures polluting emissions, such as dust, gases, vapors or greasy fumes, to prevent atmospheric pollution caused by industrial waste, helping the population to avoid the respiratory diseases that this entails, and in turn allows obtaining by-products from the separated materials for use in different products and processes.

BACKGROUND

Nowadays, we find ways to avoid contamination produced by dusts, gases, fumes, etc. Which is used in different industrial technologies. In the state of the art we find a Utility Model with Registration Title No. 2814 in my name with file number MX/u/2011/000438. Which deals with a system for capturing emissions into the atmosphere that consists of a liquefaction tank with liquid, which captures the dust, smoke or gases, which are introduced through a main duct, in which the supply of the emission that is required to be captured is connected, In this duct there is a first fan that works by absorbing and propelling the dust, smoke, gas, thus conducting it into the liquefying tank, at the end of the duct this is sealed, the side walls of the duct have at least ten exit holes, in turn has a system of at least two walls with the same effect and perforations, thereby causing the liquefaction of the captured material; It also has its cooling system, which conducts the liquid from the tank to a coil and from there to a pump that generates the recirculation of the liquid; in the upper part of the tank it has an outlet duct through which the gases resulting from the liquefaction are conducted to a compressor, whose function is to compress the gases and introduce them into a first gas storage tank. In this Utility Model its system works as a closed circuit since it captures and stores the gases completely, the innovation that I propose allows the gases to pass freely through the device capturing only dust particles, smoke with grease, gas or steam.

DESCRIPTION OF THE INVENTION

The characteristic details of this novel GREASE EMISSION CAPTURE DEVICE are clearly shown in the following description and accompanying drawings, as well as an illustration thereof and following the reference signs to indicate the parts and figures shown.

Figure 1:
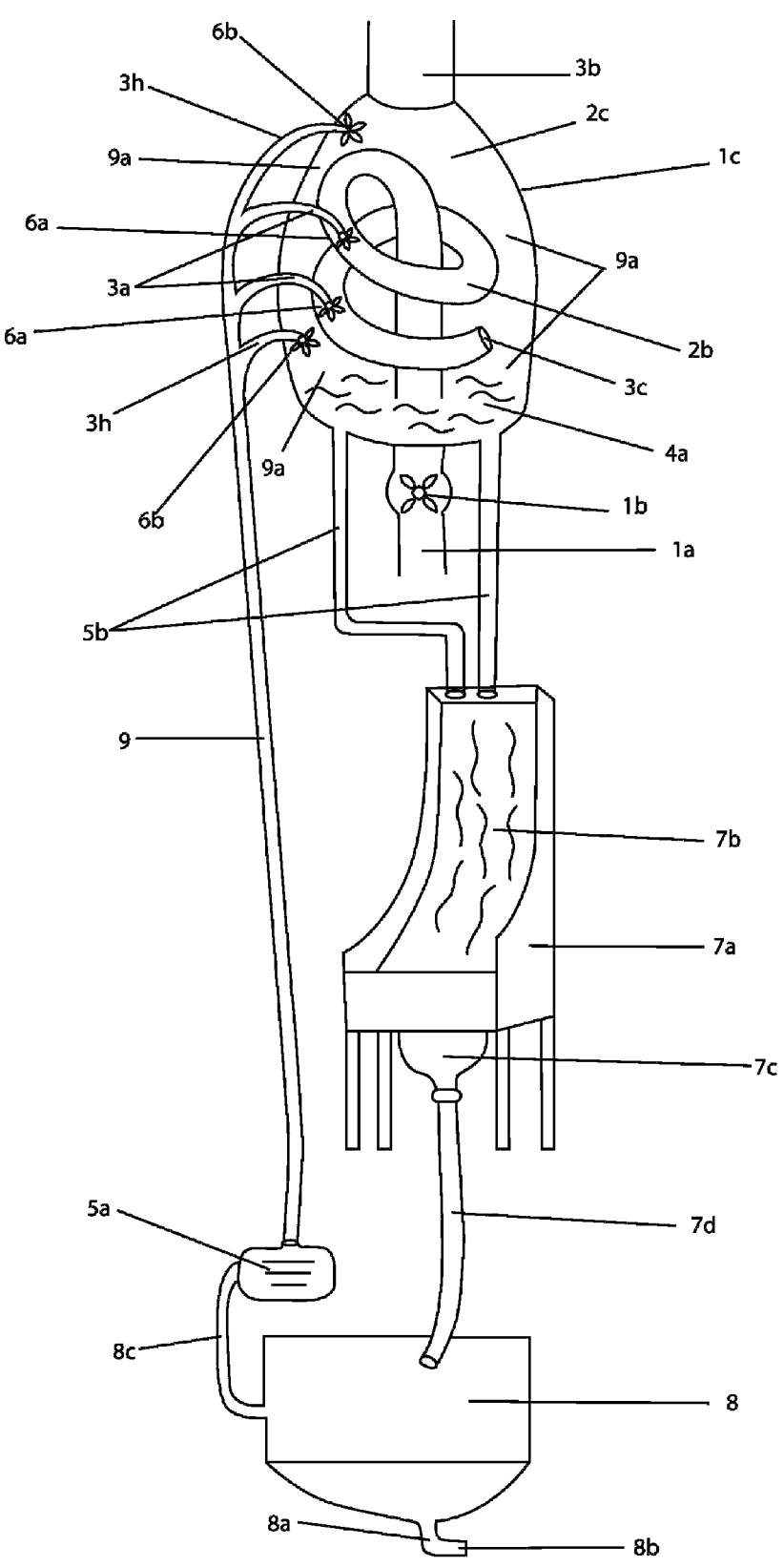
FIG. 1.—View of the device and the interaction of its parts.
Figure 2:
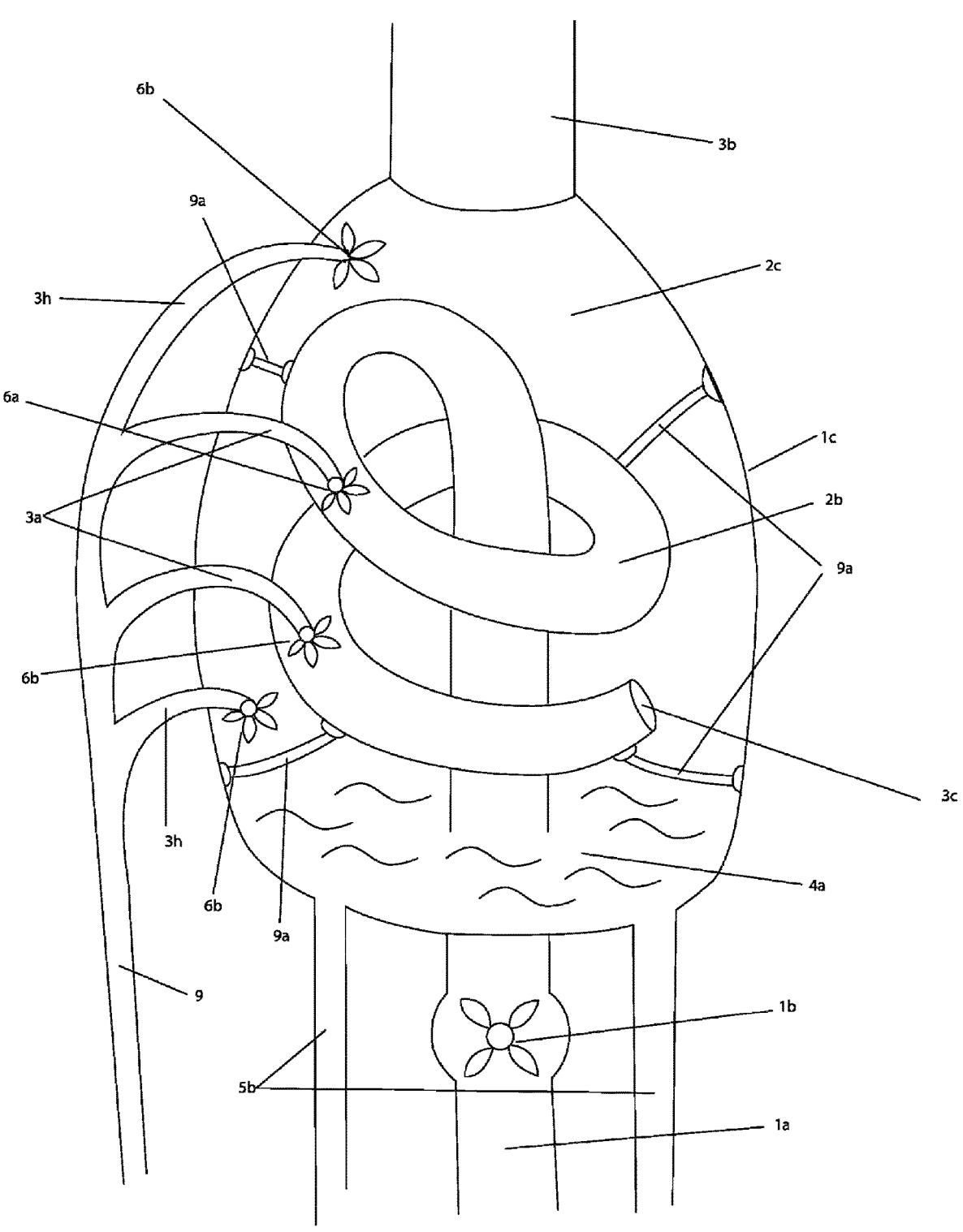
FIG. 2.—View of the emission capture tank.
Figure 3:
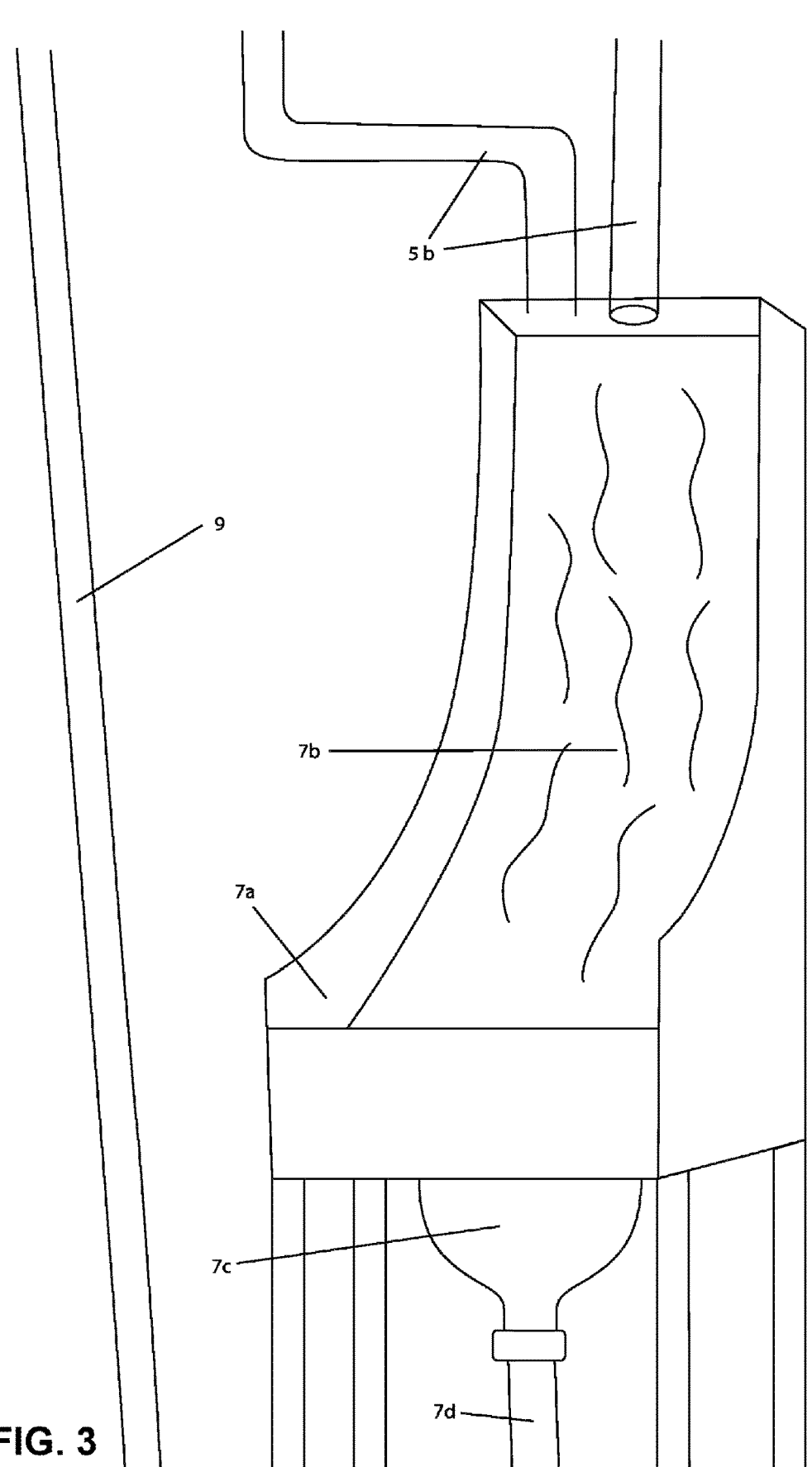
FIG. 3.—View of the liquid cooler.
Figure 4:
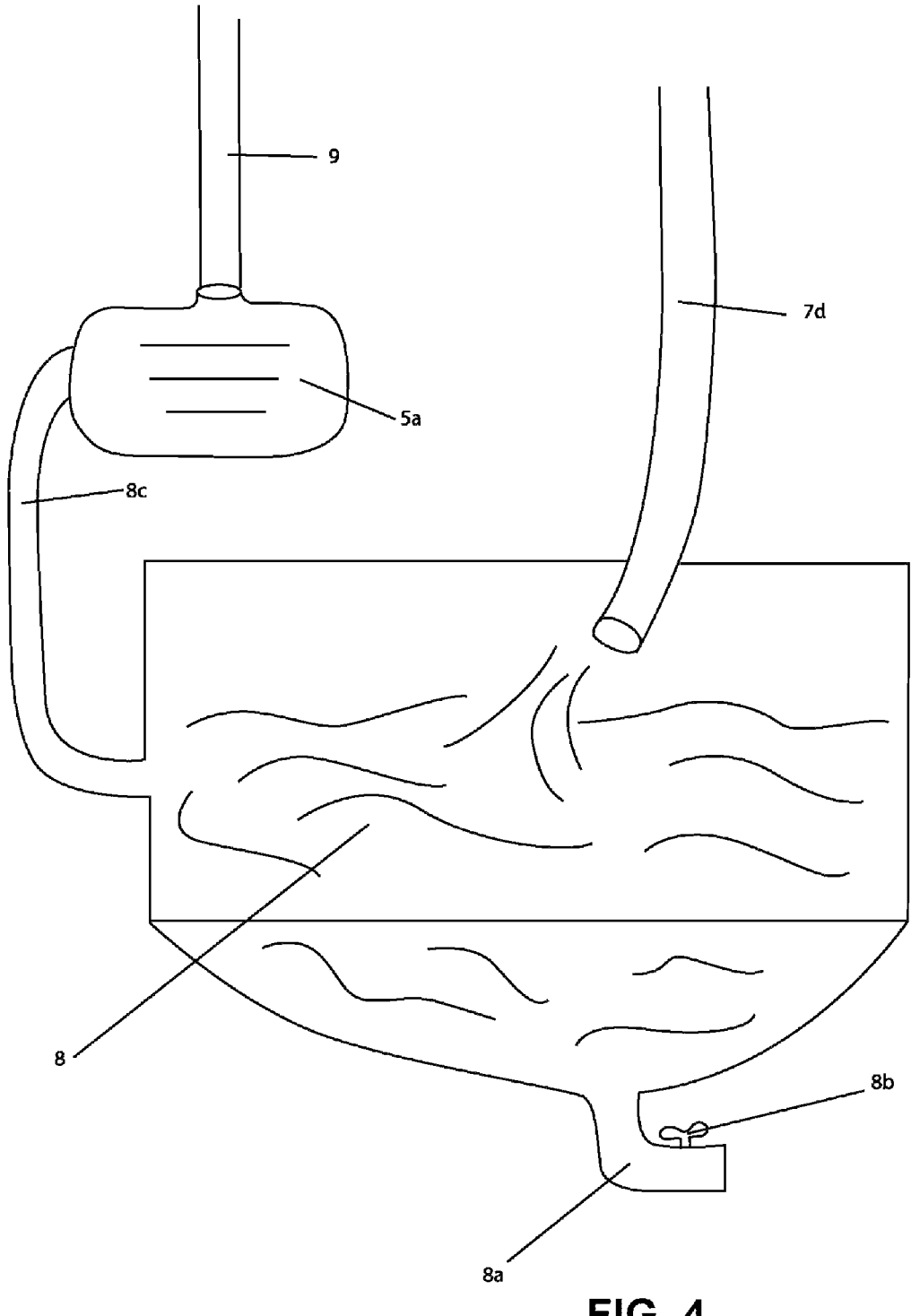
FIG. 4.—View of the settling tank.

With reference to said figures the grease emission capture device consists of:

A main duct 1a, here is connected to the outlet of the particulate emitter that is required to be treated (such emitter is conventional, such as an internal combustion engine exhaust, incinerator duct, meat roaster stack, etc. Just to mention a few), which is then absorbed and driven by an electric fan 1b, from which its wind force drives the emissions into the emissions capture tank 1c, the mechanism 2b for dissolving the emissions particles inside the tank 1c consists of, of the main duct 1a in whose interior 2c of the tank 1c arrives until the upper part inside the tank 1c making a return 2b in spiral form towards the lower part of the tank 1c having the main duct 1a its end 3c, same by which the emission already dissolved in the liquid 4a comes out, between the mechanism 2b to dissolve the emission and the walls of the tank 1c has four supports 9a, in the upper part of the tank 1c has its exit duct 3b to the open air, it also has four ducts 3a and 3h of entrance of liquid 4a, as water mixed with some degreasing liquid, said liquid 4a is transported impelling by a pump 5a, the ducts 3a and 3h in their final end have a spiral jet device 6a, in such a way that the mechanism 6a and 6b are activated in an internal way with the impulse of the liquid 4a and in an external way with the force generated by the emission flow, two ducts 3a are going to flow inside the device 2b to dissolve the emissions while other two ducts 3h are going to flow inside 2c of the space of the tank 1c helping with them to dissolve the emission being treated, in the lower part of the tank 1c has two outlets 5b to drain the liquid 4a and direct it to a cooling device 7a, the liquid 4a enters through the upper part of the device 7a sliding by means of a metal plate 7b exposed to the free air to take advantage of the ambient temperature, the liquid 4a falls into a reservoir 7c to be transported from there by means of a duct 7d which is connected to a decanter tank 8, which at the bottom has a duct 8a and a tap 8b for draining the tank 8, On one side of the decanter tank 8 there is a duct 8c that is connected directly to a pump 5a which is in charge of impelling and supplying the liquid 4a through its outlet duct 9 directly to the ducts 3h and 3a that are in charge of distributing the liquid 4a to the emissions capture tank 1c and to its mechanism 2b to dissolve the emissions that are treated there.

Based on the above, we can state that the grease emission capture device provides the following benefits:

1. It consists of a reduced number of stages.
2. The device offers a new alternative to treat and capture air emissions in an environmentally friendly way.
3. This device is simple to operate.
4. It can be modulated because the stages of the process can be repeated.
5. The device can be adapted to work with sensors, flow meters, temperature, volume, etc., which will speed up operation times.

The invention claimed is:

1. An emission capture apparatus, comprising:
   a main duct for connection to a particulate emitter having emissions for treatment;
   a fan positioned in a first portion of said main duct, said fan for forcing said emissions through a spiral portion of said main duct, said spiral portion positioned within an upper end of an interior cavity of a capture tank;
   a first outlet duct connected between a pump and entrance ducts coupled with said spiral portion of said main duct;
   said pump for communicating a first fluid stream through said first outlet duct to said entrance ducts and into said spiral portion of said main duct;
   a main duct exit at a distal end of said spiral portion for communicating a liquid mixture of said emissions mixed with said first fluid stream, into a reservoir defined by a lower end of said interior cavity;
   an outlet coupled with said interior cavity at said lower end of said capture tank, said outlet for communicating said liquid mixture from said reservoir into an interior chamber of a cooling device;
   a first drain duct coupled between a lower end of said cooling device and a decanter tank, said first drain duct for communicating said liquid mixture from said interior chamber of said cooling device into an interior of said decanter tank;

a tap, said tap actuable to drain said liquid mixture from said interior of said decanter tank; and a second drain duct connected between said decanter tank and said pump, said second drain duct for communicating said liquid mixture from said interior of said decanter to said pump, whereby particulate in said emissions is captured in said liquid mixture and can be disposed of through said tap.

2. The emission capture apparatus of claim 1 additionally comprising said first outlet duct also connected between said pump and tank entrance ducts connected to said interior cavity of said capture tank; and said pump for communicating said first fluid stream through said first outlet duct to said tank entrance ducts, whereby said first fluid stream is pumped through said entrance ducts and into said spiral portion of said main duct and through said tank entrance ducts into said interior cavity of said capture tank.

3. The emission capture apparatus of claim 2 additionally comprising first spiral jets positioned within spiral portion of said main duct at said entrance ducts; and second spiral jets positioned within said interior cavity of said capture tank at said tank entrance ducts.

4. The emission capture apparatus of claim 3 wherein said liquid mixture is formed of water mixed with a degreasing liquid.

5. The emission capture apparatus of claim 3 additionally comprising:

supports extending between an exterior surface of said spiral portion and an interior surface of said capture tank defining said interior cavity thereof; and said support holding said spiral portion elevated above said lower end of said interior cavity.

6. The emission capture apparatus of claim 2 wherein said liquid mixture is formed of water mixed with a degreasing liquid.

7. The emission capture apparatus of claim 2 additionally comprising:

supports extending between an exterior surface of said spiral portion and an interior surface of said capture tank defining said interior cavity thereof; and said support holding said spiral portion elevated above said lower end of said interior cavity.

8. The emission capture apparatus of claim 1 additionally comprising spiral jets positioned within spiral portion of said main duct at said entrance ducts.

9. The emission capture apparatus of claim 8 wherein said liquid mixture is formed of water mixed with a degreasing liquid.

10. The emission capture apparatus of claim 8 additionally comprising:

supports extending between an exterior surface of said spiral portion and an interior surface of said capture tank defining said interior cavity thereof; and said support holding said spiral portion elevated above said lower end of said interior cavity.

11. The emission capture apparatus of claim 1 wherein said liquid mixture is formed of water mixed with a degreasing liquid.

12. The emission capture apparatus of claim 1 additionally comprising:

supports extending between an exterior surface of said spiral portion and an interior surface of said capture tank defining said interior cavity thereof; and said support holding said spiral portion elevated above said lower end of said interior cavity.

* * * * *